United States Patent [19]

Meisner et al.

[11] 4,225,776
[45] Sep. 30, 1980

[54] ELECTRONIC DIGITAL TIME DISPLAY APPARATUS

[75] Inventors: Alfred Meisner; Werner F. Arnold, both of Nuremberg, Fed. Rep. of Germany

[73] Assignee: Firma DIEHL, Nuremberg, Fed. Rep. of Germany

[21] Appl. No.: 815,943

[22] Filed: Jul. 14, 1977

[30] Foreign Application Priority Data

Jul. 14, 1976 [DE] Fed. Rep. of Germany ....... 2631590

[51] Int. Cl.² .............................................. H05B 9/06
[52] U.S. Cl. ................................... 219/492; 364/705; 364/900; 219/494
[58] Field of Search ................. 219/492, 494, 10.55 B, 219/493, 497; 364/100, 900; 58/39.5, 152 B

[56] References Cited

U.S. PATENT DOCUMENTS

| 3,819,906 | 6/1974 | Gould, Jr. ........................... 219/498 |
|---|---|---|
| 3,932,723 | 1/1976 | Tamano et al. ....................... 58/39.5 |
| 4,011,428 | 3/1977 | Fosnough et al. ............ 219/10.55 B |
| 4,023,345 | 5/1977 | Imamura ................................ 58/39.5 |
| 4,104,864 | 8/1978 | Ishikawa et al. ...................... 58/39.5 |
| 4,147,021 | 4/1979 | Kondo ................................. 58/152 B |

*Primary Examiner*—Roy N. Envall, Jr.
*Assistant Examiner*—M. Paschall
*Attorney, Agent, or Firm*—Burns, Doane, Swecker & Mathis

[57] ABSTRACT

A digital clock device includes data storage units and produces switching signals in response to the data stored in accordance with predetermined functions, such as time of day and lapse of time. Switching signals responsive to quantities not related to time can also be produced. Data being stored is displayed as it is being entered into the device. In a disclosed embodiment, the device is used for the control of an electric range. Start of cooking time and duration of cooking for the oven and the individual heating plates can be controlled. Programmed control of oven temperature is also possible.

18 Claims, 3 Drawing Figures

ELECTRONIC DIGITAL TIME DISPLAY APPARATUS

BACKGROUND OF THE INVENTION

The invention relates to a digital clock in which the time of day is continuously displayed. More particularly, it relates to a digital clock capable of receiving input data pertinent to a function to be performed by the clock, which data can be displayed instead of the current time.

A clock of this type is described in commonly assigned German Pat. No. 2,117,756. In the device of this patent, data for the adjustment or shifting of the time displayed by the clock is supplied through a first feeding mechanism. Pertinent dates or deadlines are entered and addressed through a second feeding mechanism, which is designed as a keyboard. In operation, the deadline or date is entered via the keyboard and digitally stored in a deadline memory. After entry has been completed, a function key labelled as an address key is operated and the stored data is displayed by the clock's display mechanism. A comparator within the device continuously compares the current clock time with the stored deadline or date. When the two coincide, display of the current time is interrupted and the deadline or date is displayed along with the production of an acoustic signal. The acoustic signal and the display of the deadline or date is terminated by operation of a second function key, after which the current time is again displayed. The device also includes a circuit which terminates the acoustic signal and the display of the deadline or date automatically if the second function key is not operated within a predetermined time period.

A device of this type possesses certain inherent drawbacks. The requirement of two feeding mechanisms for different functions imposes an unnecessary manufacturing cost. The inability to display the data as it is being entered results in a time consuming process should the need for error correction arise.

Digital clocks with data storage and diverse function operation of the type described have been utilized for the automatic control of an electric range. In one type of prior art device used for this purpose, an operating key is actuated to suppress the display of the current time on the display mechanism of the clock. This provides the operator with a time period of approximately 20 seconds within which input data such as the start of cooking time, the end of cooking time or the duration of cooking can be entered. If all the necessary data has not been entered within the 20 second interval, the process is interrupted and the entry of data operation must be repeated until it can be accurately and completely accomplished. The drawback of such a time constraint on the operator is readily apparent.

OBJECTS AND BRIEF SUMMARY OF THE INVENTION

Accordingly, it is an object of the present invention to provide a novel apparatus for the entry of data into an electronic instrument capable of continuously displaying the current time wherein the user is not subject to any time constraints during entry.

It is a further object of the invention to provide a novel apparatus for the entry of data into an electronic digital clock device in which data pertinent to a plurality of functions can be entered through the use of a single data entry mechanism.

It is another object of the invention to provide a novel apparatus for the entry of data into an electronic digitial clock device in which the data is displayed as it is being entered.

In accordance with the invention, these and other obejcts and advantages are achieved through the use of a data input control circuit and a function input control circuit which control the information being displayed on the display mechanism of a digital clock device as data is entered into the clock. Data pertinent to a function performed by the device is entered into the device through an input unit and stored in a data storage means. As the data is being entered and stored, and the data input control circuit causes an interruption in the display of current time by the display mechanism and presents the data for display. Once the data is correctly entered, a function key is operated which assigns the stored data to a function storage means associated with the key for use by the device in accordance with a function to be performed. Deactivation of the key causes the display of data to be terminated and permits the current time to be displayed again.

In a disclosed embodiment, the digital clock device is utilized for the control of an electric range. Data entered into the device can include the end of a cooking period, duration of a cooking period, selection of a program for oven temperature control, and actuation time of the individual heating plate units of the range. A time control circuit is provided which calculates the beginning of a cooking period from data relating to the duration and the end of a cooking time, and actuates an oven control at the appropriate time. A program control circuit is provided which selects a particular cooking program from a plurality of stored programs in accordance with the selected program. A range plate control circuit individually controls the actuation time of each of the heating plates in accordance with data stored in a data storage means associated therewith.

DETAILED DESCRIPTION OF THE DRAWINGS

Figure 1:
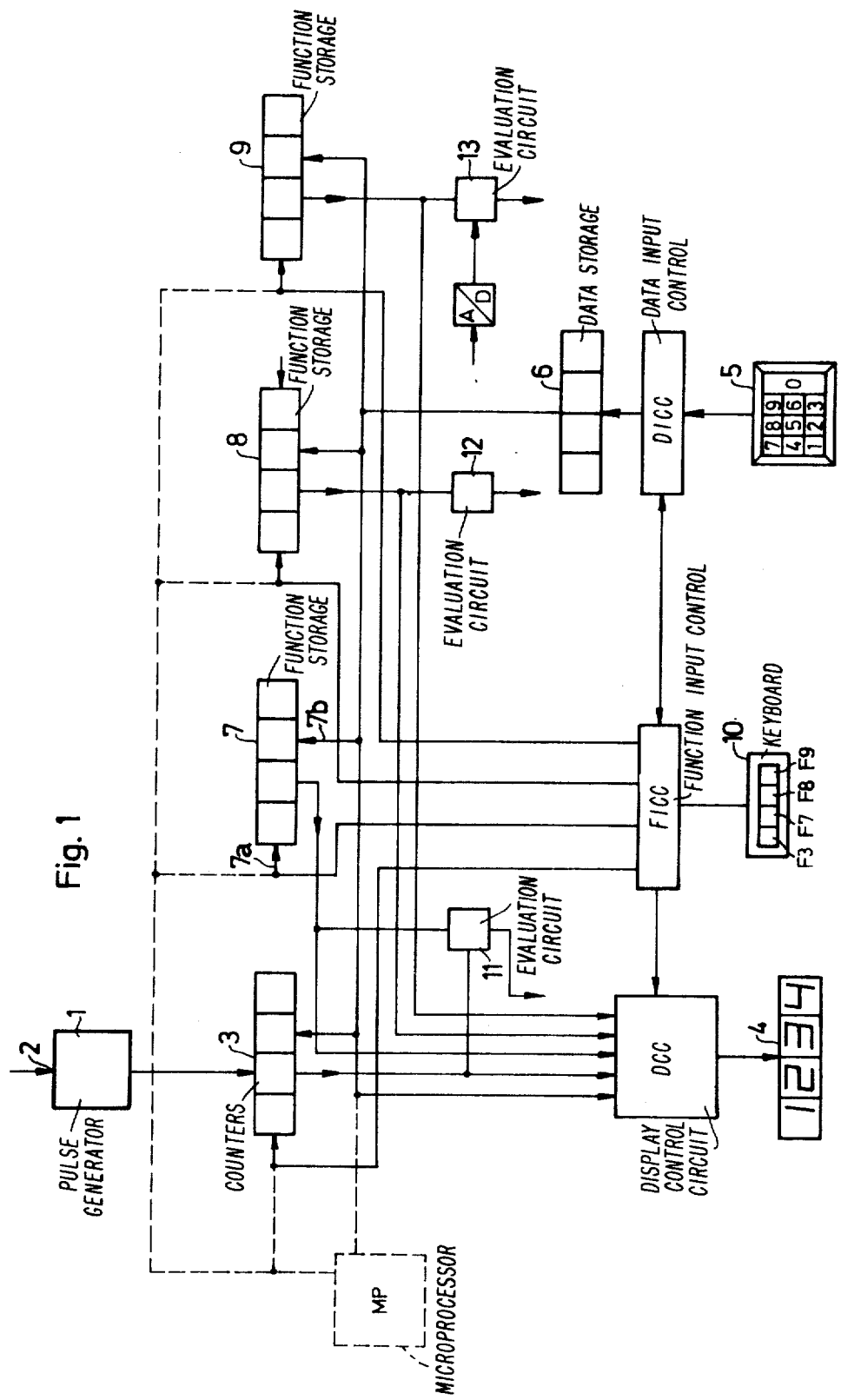
FIG. 1 is a schematic block diagram of a digital clock device with data input and storage units and function control and storage units.

FIG. 1 illustrates an electronic device in schematic block form, which device is designed as a digital clock capable of continuously displaying the current time and producing switching signals in accordance with predetermined functions. The invention is not limited to this particular application, however, but may be utilized as an alarm clock, a counter with a pre-selectable adjustment of a controlling parameter such as a starting or ending point, a control instrument for manufacturing processes or a time monitor for the measurement of lapsed time.

In FIG. 1, a pulse generator is shown at 1 whose output signal has a frequency of 1 pulse per minute. The signal at input terminal 2 of the pulse generator 1 is a signal of standard frequency which can be derived from a common network signal having a known frequency.

As will be apparent to one of ordinary skill in the art, a frequency divider for dividing the frequency of a signal having a standard known frequency or a crystal oscillator could readily be substituted for pulse generator disclosed here.

A counting apparatus 3 connected with the output terminal of pulse generator 1 consists of two counters. A first counter capable of counting up to 60 is for counting the minute pulses in the output signal of the pulse generator, and a second counter connected thereto is capable of counting up to 24 for keeping track of the hour. The combination of the pulse generator and the counting apparatus together form a time clock for the production of time signals. An output terminal of the counting apparatus is connected to a display control circuit DCC, and controls digital display means 4. The display control circuit includes a decoding circuit for converting the time signals from the counting apparatus 3 into suitable triggering signals for control of the display means 4, which can take the form of the known 7 segment display unit. Such a display unit uses light tubes as recording elements. It is also possible, however, to use a liquid crystal or any other type of known display unit in the context of the invention. The display control circuit is a circuit which is known per se and available either by itself or in combination with a display unit.

Shown as 5 is a numerical keyboard, in this instance, a decimal keyboard, which serves as a data input unit for the input of clock time data and other relevant data. It is possible to utilize in place of the keyboard a manually rotatable pulse transmitting wheel (one type of which is known as an Impulsrad), such as that disclosed in commonly assigned German Auslegeschrift No. 2,540,486. Connected with the data input unit 5 is a data input control circuit DICC which controls the input of data entered on data input unit 5 to data storage circuit 6. Basically, data input control circuit DICC comprises a decoding circuit which converts the output signal of data input unit 5 into a form suitable for storage by the storage circuit 6. The data storage circuit 6 is connected with input terminals of the counting apparatus 3 and the display control circuit DCC.

A plurality of function storage circuit 7, 8 and 9 are provided for the storage of additional data and have input terminals connected with data storage circuit 6. Data storage circuit 6 may take the form of a shift register and function storage circuits 7-9 may be either counters or static storage devices.

An evaluation circuit 11, 12 or 13 is connected to an output terminal of each of the function storage circuits 7, 8 or 9, respectively. The evaluation circuits are designed to function in accordance with the purpose of the data stored in their associated function storage circuits. For example, evaluation circuit 11 can be a comparator which compares the data stored in function storage circuit 7, representative of a clocktime value, with the current clock time as represented in the output signal of counting apparatus 3. Upon coincidence of the two time values, an output signal is produced which can be used as a switching signal. Function storage circuit 8 can be a reversible binary counter, i.e. the type which counts backwards from a preadjusted value to zero. Associated evaluation circuit 12 can deliver a switching signal upon detecting that the count in storage circuit 8 has reached zero. Function storage circuit 9 can serve to store a physical value not necessarily related to time, such as a temperature or other quantity. Evaluation circuit 13 in this case might be a comparator which compares the value stored in function storage circuit 9 with the output signal of an analog to digital converter, whose input signal is a measure of a physical value which is to be monitored, such as a temperature or other quantity.

The control of the entry of data stored in data storage circuit 6 into the individual function storage circuits is performed by function keyboard 10 and function input control circuit FICC connected thereto. Acutation of one of the function keys F3, F7, F8 or F9 on function keyboard 10 causes the data stored in data storage circuit 6 to be entered into the function storage circuit or counting apparatus associated therewith. For example, actuation of function key F7 causes function input control circuit FICC to send an enabling signal to set terminal 7a of function storage circuit 7, allowing data stored in data storage circuit 6 to be entered into the function storage circuit through data input terminal 7b. It is to be noted here that although counting apparatus 3 has not been labelled as a function storage circuit, it is controlled by keyboard 10 and function input control circuit FICC in the same manner as function storage circuits 7-9 to allow for adjustment or corrections of the current time being displayed on display means 4. It will be readily apparent to one of ordinary skill in the art that other known circuits which perform this function can be utilized in the context of the invention as well.

Counting apparatus 3 and function storage circuits 7-9 can be integrated circuit having a provision for adjustment of data contained therein and a plurality of input terminals, which are readily obtainable on the market. Integrated circuits can also be used for the display control circuit DCC and data storage circuit 6. It is furthermore possible within the context of the invention and present level of technology to design the entire electronic circuit, including the data input control circuit and the function input control circuit as well as the previously mentioned circuits, as a single integrated circuit.

It would be further possible to utilize a microprocessor MP, shown in dotted lines, in the invention. In this case, the microprocessor can be designed within the ordinary level of skill in the art to perform the functions of pulse generator 1, data input control circuit DICC, function input control circuit FICC and evaluation circuit 11-13 to thereby control the entire operation of the device.

The operation of the circuit illustrated in FIG. 1 will now be explained. Pulse generator 1 continuously produces a series of pulses spaced one minute apart which are counted in counting apparatus 3 as a measure of the current time. The count of the current time stored in counting apparatus 3 is transmitted to display control circuit DCC and displayed on display means 4. When a user desires a switching signal to be produced at a specific time, the time is entered into data storage 6. For example, the time 12:10 o'clock is entered by operating the keys 1 2 1 0 of keyboard 5 in sequence, which data is encoded by data input control circuit DICC and fed into data input storage 6, wherein the digits are continuously shifted from right to left as the data is being entered. Upon actuation of the first key in keyboard 5 for the entry of data, data input control circuit DICC sends a signal to the function input control circuit FICC to be transmitted therefrom to display control circuit DCC to interrupt the display of the current time and begin display of the data being entered. This operation is analogous to that which takes place in some electronic calcu lators, and therefore similar circuitry for performing such can be utilized.

The information stored in data storage circuit 7 is present at the data input terminals of the counting apparatus 3 and the function storage circuit 7-9. The user must determine what information is present in the data which has been entered, for example, the beginning of a switching period, and actuate the corresponding function key in keyboard 10. In this example, the information is to be stored in function storage circuit 7, and so function key F7 would be actuated. Upon actuation of the key, set terminal 7a of the function storage circuit receives a setting signal which permits entry of the data present at data input terminal 7b into the storage circuit to be stored. While the setting signal and data signal lines are illustrated as being connected to the function storage circuit in parallel, it is also possible to utilize a storage circuit in which the setting and data signals enter the storage circuit in series along a common input line. Upon deactuation of function key F7, a signal is sent via the function input control circuit FICC to the display control circuit DCC to terminate the display of the data stored in data storage circuit 6 and resume the display of the current time, as explained previously. The data stored in data storage circuit 6 may be erased upon deactuation of the function key as well. With this, the input of data into the device has been completed.

The function keys can also be used to address any of the individual function storage circuit to check the contents thereof without the need to operate keyboard 5. For example, if it is desired to check the contents of function storage circuit 7, key F7 is actuated. This operates in the same manner as actuation of one of the keys of keyboard 5 to interrupt the display of the current time and cause display of the data stored in function storage circuit 7 for the duration of the time during which key F7 is actuated. For this reason the output terminals of the function storage circuits are connected with the display control circuit DCC as well as their respective evaluation circuits.

Figure 2:
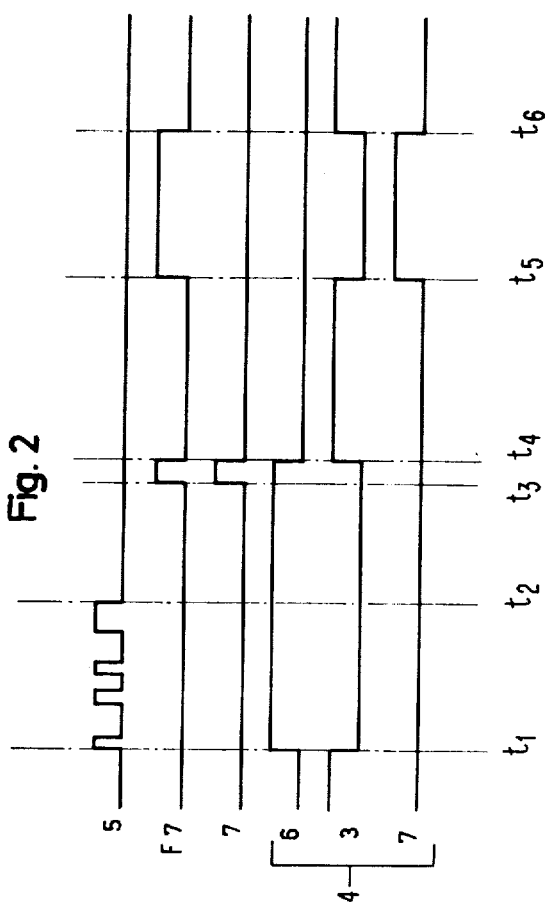
FIG. 2 is a pulse diagram illustrating the relative operation of the circuits shown in FIG. 1.

FIG. 2 illustrates the correlation of signals produced by operation of the keys of keyboards 5 and 10 with the information displayed on display means 4 with respect to the example given previously. The top line of pulses, labelled 5, illustrates the time of operation of keys in keyboard 5. The second line of pulses, F7, illustrates the time of operation of function key F7. The third line from the top illustrates time of entry of data into function storage circuit 7. The bottom three lines collectively illustrate the information being displayed on display means 4.

It can be seen that prior to time $t_1$, the information displayed on display means 4 is the current time as represented by the contents of counting apparatus 3. At time $t_1$, the first key in keyboard 5 is actuated for the entry of data into the device. Upon actuation of the key, the display of the current time is interrupted and the contents of data storage circuit 6, i.e. the data being entered, is displayed in its place. The completion of the entry of the data into data storage circuit 6 through keyboard 5 takes place at time $t_2$. Thereafter, at time $t_3$, the user actuates function key F7 to cause the data stored in data storage circuit 6 to be entered into function storage circuit 7, as shown in the third line from the top. Deactuation of the function key at time $t_4$ terminates the display of data on display means 4 and resumes the display of the current time. Thereafter, if the user desires to check the contents of data storage circuit 7, function key F7 is actuated, as shown at time $t_5$. For the duration of the actuation of the function key, i.e. until time $t_6$, the display of current time is interrupted and the contents of function storage circuit 7 are displayed. Thereafter, the display of the current time is again resumed.

From the foregoing it may be seen that the duration of the time of operation of the keys of keyboard 5 may be completely arbitrary without any consideration as to time constraints. The time of restoration of display of the current time and the entry of data into the function storage circuit is also arbitrary and under the control of a function key independent of the data entry keys.

Figure 3:
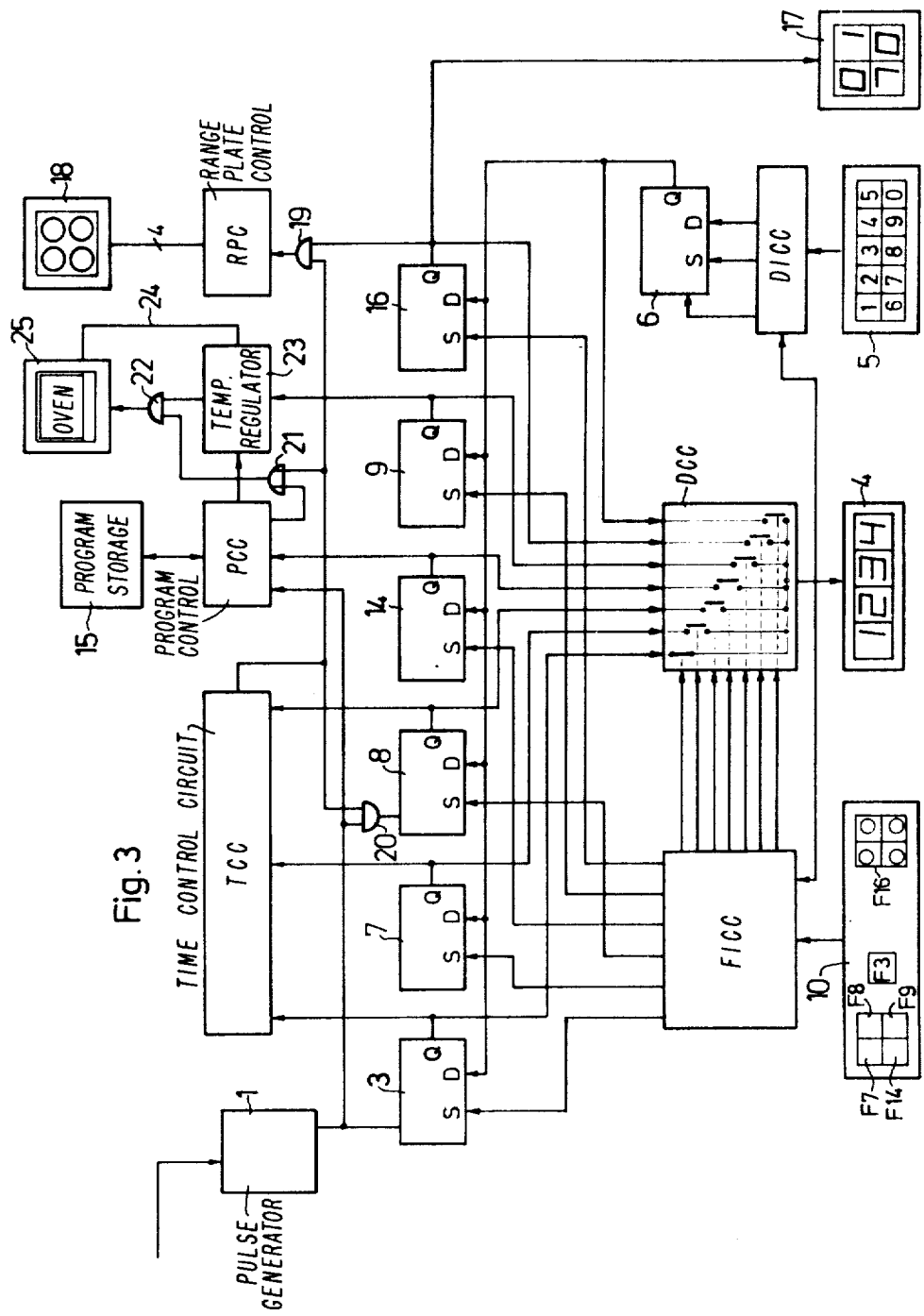
FIG. 3 is a schematic block diagram of the device of FIG. 1 adapted for use as an oven control device.

FIG. 3 illustrates an embodiment of the invention in which a display and switching circuit similar to that shown in FIG. 1 is utilized for the control of an electric range. Elements which are the same as those shown in FIG. 1 are illustrated with the same reference characters. The essential differences from the circuit illustrated in FIG. 1 consist of the addition of a range heating plate control unit with corresponding function keys and separate display means, a program control circuit with a corresponding program storage for control of the oven, and a time control circuit which is a modification and combination of evaluation circuits shown in FIG. 1.

A program selection storage circuit 14 provided in the embodiment of FIG. 3 is used to store information relating to a particular oven control program. The program selection storage circuit has a function key F14 associated therewith located on keyboard 10 and operates in a manner similar to function storage circuits 7-9. Connected with the output terminal of storage circuit 14 is a program control circuit PCC which utilizes the information stored in storage circuit 14 to select a particular cooking program from a plurality of such programs stored in program storage 15. The program can be stored in any suitable form which is readable by an electronic circuit, such as punched cards, or tape, magnetic tape or disc, or the like.

Shown at 16 is a range plate function storage circuit which operates in a similar fashion to the other function storage circuits and has associated therewith a plurality of function key F16 in keyboard 10. Storage circuit 16 is capable of storing four one-digit numbers, with numbers respectively contain information relating to the time when each of the four range heating plate units shown at 18 are to be turned on. Connected with the output terminal of storage circuit 16 is a second display means 17 which displays the contents of storage circuit 16 in a block four format. Also connected with the output terminal of storage circuit 16 via AND gate 19 is a range plate control circuit RPC. The range plate control circuit is connected with range plate unit 18 via a four conductor cable and controls the individual range heating plates in accordance with the information stored in range plate function storage circuit 16. The spatial arrangement of the four function keys F16 and four display portions of second display means 17 corresponds with the spatial arrangement of the four heating plates in range plate unit 18.

The information stored in range plate function storage circuit 16 can be utilized in a variety of ways. The one-digit numbers may be indicative of a number of predetermined time periods which define the duration of operation of their associated heating plate. For example, if the number 7 is entered into storage circuit 6 via keyboard 5 and followed by actuation of lower left function key F16, and thereafter the "1" key of keyboard 5 and the upper right function key F16 are sequentially actuated, the data would be stored in storage circuit 16 and second display means 17 would be actuated as shown in FIG. 3. If the predetermined time periods are three minutes each, the lower left heating plate in unit 18 would be turned on 21 minutes before the end of cooking time stored in storage circuit 7 and the upper right heating plate would be turned on 3 minutes before the end of cooking time. The time control circuit TCC, to be explained in more detail hereinafter, calculates the time periods and sends a signal to AND gate 19, which enables the range plate control circuit RPC to actuate the appropriate one of the heating plates whenever the signal from time control circuit TCC coincides with the information stored in storage circuit 16. While the input of the signal into range plate control circuit RPC is illustrated in FIG. 3 as being via a single AND gate 19 in which the information relating to each heating plate would be in series, it is also possible to utilize four AND gates to feed the information for each of the heating plates into the range plate control circuit RPC in parallel.

An alternative method of utilizing the information stored in storage circuit 16 is to have the one-digit numbers indicate a number of equal portions of the duration of cooking time stored in storage circuit 8. In this case, instead of having a preestablished time period, the time control circuit TCC would divide the time period stored in storage circuit 8 into a number of equal portions. The information stored in storage circuit 16 would define the duration of operation of an associated heating plate in terms of a number of the equal portions of time.

The time control circuit TCC basically comprises a calculating circuit which utilizes the information stored in function storage circuits 7 and 8 as well as the output signal of counting apparatus 3 to send out appropriate control signals for control of the duration of oven 25 and the range heating plates. The time control circuit computes the beginning of an oven cooking time from the end of a cooking time stored in storage circuit 7 and the duration of cooking time stored in storage circuit 8. At the calculated time, as determined by comparison with the output signal of counting apparatus 3, an output signal is produced which enables AND gate 20 and begins the counting down to zero of the contents of storage circuit 8 at a rate determined by the output signal of pulse generator 1. At the same time, the output signal of the time control circuit is transmitted via OR gate 21 and AND gate 22 to begin operation of oven 25. The temperature of the oven is regulated by temperature regulation circuit 23. The regulation circuit receives information relating to the temperature to be maintained from storage circuit 9 and compares this with the actual oven temperature transmitted via feedback line 24 to control actuation of the oven through AND gate 22. Temperature regulation circuit 23 may also be controlled by program control circuit PCC to operate the oven in accordance with a preselected roasting or baking program. The program control circuit is capable of turning the oven on or off instead of or in conjunction with the time control circuit through a second input terminal to OR gate 21.

In operation, the range control circuit illustrated in FIG. 3 operates in basically the same manner as the circuit of FIG. 1. The current clock time is set or corrected by entering the correct time via keyboard 5 and data input control circuit DICC into storage circuit 6 and actuating function key F3 on keyboard 10 to feed the time count into counting apparatus 3. Thereafter the current time is displayed on display means 4 in accordance with the output signal of pulse generator 1.

Information relating to the end of a cooking time is digitally entered into storage circuit 6 via keyboard 5. Upon depression of the first key of keyboard 5, the data input control circuit DICC sends a signal to the function input control circuit FICC, sich as by the setting of a flip-flop in the data input control circuit. In response to such signal, the display of the current time is interrupted and the contents of storage circuit 6 are displayed on display means 4 under the control of the display control circuit DCC and the function input control circuit FICC. Thereafter, actuation of function key F7 causes the contents of storage circuit 6 to be entered into storage circuit 7 and deactuation of the function key causes the display of current time to be resume, as described previously.

Information relating to the duration of a cooking period may be entered into function storage circuit 8 in a similar manner, utilizing function key F8. Subsequent to the entry of the information relating to the duration and end of a cooking period, the beginning of the cooking period is calculated in time control circuit TCC and compared with the current time as represented by the output signal of counting apparatus 3. At the appropriate time, the time control circuit TCC produces an output signal which is delivered to an input terminal of AND gate 20, OR gate 21 and AND gate 19. Provided the temperature in oven 25 is lower than that stored in function storage circit 9, temperature regulation circuit 23 delivers an enabling signal to AND gate 22 to turn on the oven. When the temperature in the oven reaches the temperature stored in storage circuit 9, the enabling signal to AND gate 22 is removed and the supply of power to the oven is blocked. This temperature regulation process continues until the signal from time control circuit TCC to OR gate 21 is removed. This occurs when the contents of storage circuit 8 have been counted down to zero.

For control of the range heating plates, the entry of information relating to the end of the cooking time and the duration thereof into storage circuits 7 and 8 takes place in the same manner. Additional information pertaining to the stage of the cooking period during which the individual range heating plates are to be turned on is entered via keyboard 5 and stored in storage circuit 16 through operation of function keys F16. The information stored in storage circuit 16 is effective to turn on the heating plates only after AND gate 19 has been enabled by the output signal from time control circuit TCC. The temperatures to be maintained by the heating plates are set on separate controls present at either the range plate unit 18 or the range plate control circuit RPC. The heating plates are turned off after the contents of storage circuit 8 have been counted down to zero and the output signal from the time control circuit TCC is thereby terminated.

From the foregoing it can be seen that one embodiment of the invention provides a novel arrangement for an electric range clock and control circuit in which the entry of data is carried out in a simple manner through the use of a single data input keyboard, eliminating the previous confusion to the user caused by a plurality of possibilities for the manner of entering data and the time constraints imposed on such entry.

The present invention may be embodied in other specific forms without departing from the spirit or essential characteristics thereof. The presently disclosed embodiments are therefore considered in all respect as illustrative and not restrictive. The scope of the invention is defined by the appended claims rather than the foregoing description, and all changes which come within the meaning and range of equivalency of the claims are therefore entended to be embraced therein.

What is claimed is:

1. An electronic digital time display apparatus comprising:
   display means;
   a time clock for the production of time signals;
   a display control circuit for control of said display means and responsive to said time clock to cause the current time to normally be displayed;
   a data input unit;
   means for storage of data entered in said data input unit and having at least one output terminal for the presentation of data stored therein;
   data input control means responsive to said data input unit for control of said data storage means, said data input control means being connected with said display control circuit and operative upon the initial entry of data into said data input unit to interrupt the display of the current time and cause the contents of said data storage means present at said output terminal to be displayed;
   a plurality of function storage units connected in common along a single data line with the output terminal of said data storage means;
   a plurality of function keys respectively associated with said function storage units for the assignment of data entered in said data input unit to a particular function storage unit; and
   function input control means responsive to said function keys for entering the contents of said data storage means present at said output terminal in the function storage unit associated with a function key upon actuation of said key and for terminating the display of data and causing the current time to be displayed on said display means upon deactuation of said key.

2. The time display apparatus of claim 1 further including an evaluation circuit connected with at least one of said function storage units for producing a switching signal upon coincidence of the data stored in said function storage units with information entered into said evaluation circuit.

3. The apparatus of claim 1 wherein the data input is a numerical keyboard.

4. The apparatus of claim 1 wherein said function storage units are integrated circuits.

5. The apparatus of claim 1 wherein the data input control means and the function input control means are integrated circuits.

6. The apparatus of claim 1 wherein said data input control means and said function input control means are construed as a microprocessor.

7. The apparatus of claim 1 wherein said data storage means includes a shift register.

8. The apparatus of claim 2, wherein the data stored in said function storage unit is a time value representative of a switching time and the evaluation circuit is a comparator, the information entered into said evaluation circuit being the current time.

9. The apparatus of claim 2, wherein the data stored in said function storage unit is a numerical value representative of the duration of a time period, said function storage unit being a counter capable of counting down to zero, said evaluation circuit producing said switching signal when the count in said function storage unit reaches zero.

10. The apparatus of claim 2, wherein the data stored in said function storage unit is a numerical value representative of a measured value and said evaluation circuit is a comparator, the information entered into said evaluation circuit being a signal to be compared with the measured value.

11. The apparatus of claim 2, wherein the switching signals are used for the control of an electric range.

12. The apparatus of claim 11 wherein the data stored in said function storage sotrage unit is a time value representative of a switching time and the evaluation circuit is a comparator, the information entered into said evaluation circuit being the current time.

13. The apparatus of claim 11 wherein the data stored in said function storage unit is a numerical value representative of the duration of a time period, said function storage unit being a counter capable of counting down to zero, said evaluation circuit producing said switching signal when the count in said function storage unit reaches zero.

14. The apparatus of claim 11 wherein the data stored in said function storage unit is a numerical value representative of a measured value and said evaluation circuit is a comparator, the information entered into said evaluation circuit being a signal to be compared with the measured value.

15. The apparatus of claim 11, including a range plate function storage means having a plurality of storage positions and a function key associated with each of the storage positions, a second display means having a display portion associated with each of the storage positions, and a range plate control unit connected with said range plate function storage means for controlling the operation of the range heating plates of the range in accordance with the data stored in said range plate function storage means, each range heating plate having a storage position associated therewith.

16. The apparatus of claim 15 wherein the function keys associated with the storage positions and the portions of the second display means are four each in number and arranged in block format, corresponding to the spatial disposition of the range heating plates.

17. The apparatus of claim 11, including a program selection storage means and a program control circuit connected thereto, the data stored in said program selection storage means enabling said program control circuit to select a particular control program from a plurality of stored control programs, said program control circuit operating in response to the selected program to control the temperature and the operation time of the oven of said range.

18. The apparatus of claim 12 wherein the time value stored is the end of a cooking time, further including a second function storage unit for storing a numerical value representative of the duration of a cooking time, said evaluation circuit including means to calculate the start of a cooking time from the data stored in said two function storage unit, said evaluation circuit producing an oven actuating signal upon coincidence of the calculated time with the current time.

* * * * *